(12) United States Patent
Lee et al.

(10) Patent No.: US 12,513,193 B2
(45) Date of Patent: Dec. 30, 2025

(54) COMMUNICATION METHOD FOR QUANTUM SECURITY AND COMMUNICATION DEVICE SUPPORTING THE SAME

(71) Applicant: SAMSUNG SDS CO., LTD., Seoul (KR)

(72) Inventors: Chang Hoon Lee, Seoul (KR); Hun Hee Yu, Seoul (KR); Eun Kyung Kim, Seoul (KR); Hyo Jin Yoon, Seoul (KR); Ji Hoon Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 72 days.

(21) Appl. No.: 18/678,988

(22) Filed: May 30, 2024

(65) Prior Publication Data
US 2025/0023916 A1    Jan. 16, 2025

(30) Foreign Application Priority Data
Jul. 14, 2023 (KR) .................. 10-2023-0091504

(51) Int. Cl.
*H04L 9/40* (2022.01)
(52) U.S. Cl.
CPC ........ *H04L 63/166* (2013.01); *H04L 63/0435* (2013.01)
(58) Field of Classification Search
CPC ............... H04L 63/166; H04L 63/0435; H04L 63/0428; H04L 63/168; H04L 63/18; H04L 9/0852

(Continued)

(56) References Cited

U.S. PATENT DOCUMENTS

| | | | | |
|---|---|---|---|---|
| 10,158,991 | B2 * | 12/2018 | Link, II | ............... H04W 12/069 |
| 10,177,917 | B2 * | 1/2019 | Roche | .................. H04L 63/205 |

(Continued)

FOREIGN PATENT DOCUMENTS

| | | |
|---|---|---|
| CN | 113468543 A | 10/2021 |
| CN | 115314189 A | 11/2022 |
| KR | 10-1925357 B1 | 2/2019 |

OTHER PUBLICATIONS

Extended European Search Report dated Sep. 2, 2024, issued by the European Patent Office in European Application No. 24183649.3.

(Continued)

*Primary Examiner* — Samson B Lemma
(74) *Attorney, Agent, or Firm* — Sughrue Mion, PLLC (57) ABSTRACT

There is provided a communication device. The communication device may comprise one or more processors; a communication interface; and a memory that stores a computer program executed by the one or more processors, wherein the computer program includes instructions for operations of: forming a general security channel according to a first transport layer security (TLS) protocol that does not support a post-quantum cryptography algorithm with another communication device; forming a communication channel of an application layer (L7) with another communication device through the general security channel; forming a quantum security channel by performing a handshake procedure according to a second TLS protocol that supports the post-quantum cryptography algorithm with another communication device through the communication channel; and communicating with another communication device through the quantum security channel.

17 Claims, 6 Drawing Sheets

(58) Field of Classification Search
USPC .............................................................. 726/4
See application file for complete search history.

(56) References Cited

U.S. PATENT DOCUMENTS

| | | | | |
|---|---|---|---|---|
| 11,177,946 | B2* | 11/2021 | Islam | H04L 9/0852 |
| 11,218,301 | B1 | 1/2022 | Shea et al. | |
| 11,374,975 | B2 | 6/2022 | Gray et al. | |
| 11,444,753 | B1* | 9/2022 | Williams | H04L 9/0852 |
| 11,601,519 | B2 | 3/2023 | Lowe et al. | |
| 2003/0159029 | A1* | 8/2003 | Brown | H04L 63/166 |
| | | | | 713/151 |
| 2016/0182232 | A1* | 6/2016 | Roche | H04L 9/3242 |
| | | | | 713/151 |
| 2017/0019381 | A1* | 1/2017 | Khazan | H04L 9/30 |
| 2017/0272944 | A1* | 9/2017 | Link, II | H04L 9/0841 |
| 2017/0272945 | A1* | 9/2017 | Link, II | H04W 12/041 |
| 2018/0026950 | A1* | 1/2018 | Wasiq | H04L 9/0841 |
| | | | | 713/152 |
| 2020/0295933 | A1* | 9/2020 | Link, II | H04W 4/70 |
| 2020/0403787 | A1* | 12/2020 | Islam | H04L 9/0852 |
| 2022/0294609 | A1* | 9/2022 | Williams | H04L 9/0822 |
| 2023/0119304 | A1 | 4/2023 | Nagaratnam et al. | |

OTHER PUBLICATIONS

Ray et al., "Renegotiating TLS", PhoneFactor, Inc., 2009, v 1.1 (8 pages total).
Lee et al., "maTLS: How to Make TLS middlebox-aware?", Network and Distributed Systems Security (NDSS) Symposium, 2019, https://dx.doi.org/10.14722/ndss.2019.23547, pp. 1-15 (15 pages total).

* cited by examiner

COMMUNICATION METHOD FOR QUANTUM SECURITY AND COMMUNICATION DEVICE SUPPORTING THE SAME

CROSS-REFERENCE TO RELATED APPLICATION

This application claims priority from Korean Patent Application No. 10-2023-0091504 filed on Jul. 14, 2023 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a communication method for quantum security and a communication device supporting the same.

2. Description of the Related Art

As quantum computing technology develops, various works are in progress to migrate existing public key encryption algorithms (e.g., RSA, ECC, etc.) to post-quantum cryptography (PQC) algorithms.

Meanwhile, the public key encryption algorithm is a foundation technology of transport layer security (TLS), which is a major security protocol in the network (Internet) environment. Therefore, if the public key encryption algorithms do not quickly migrate to the post-quantum cryptography algorithms, many network (Internet) users are inevitably exposed to quantum threats such as harvest now decrypt later (HNDL) (i.e., security threats caused by quantum computers).

Recently, in consideration of such quantum threats, a TLS protocol (the so-called "PQC-TLS protocol") has been proposed that adds the post-quantum cryptography (PQC) algorithm to the existing TLS protocol (e.g., TLS 1.3). However, due to various limitations (e.g., cost, impact on a system, etc.), it will inevitably take a considerable amount of time for the proposed PQC-TLS protocol to be fully spread throughout the network environment, and until then, many network (Internet) users may not be free from the quantum threats.

SUMMARY

Aspects of the present disclosure provide a communication method for quantum security and a communication device supporting the same. More specifically, aspects of the present disclosure provide a method capable of performing quantum security communication between communication devices that support a post-quantum cryptography (PQC)-transport layer security (TLS) protocol, regardless of whether or not intermediate communication devices that do not support the PQC-TLS protocol (i.e., a TLS protocol that supports post-quantum cryptography algorithm) exist in a network section.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a communication method for quantum security performed by a communication device. The communication method may comprise forming a general security channel according to a first transport layer security (TLS) protocol that does not support a post-quantum cryptography algorithm with another communication device; forming a communication channel of an application layer L7 with another communication device through the general security channel; forming a quantum security channel by performing a handshake procedure according to a second TLS protocol that supports the post-quantum cryptography algorithm with another communication device through the communication channel; and communicating with another communication device through the quantum security channel.

In some embodiments, an intermediate communication device that supports only the first TLS protocol among the first TLS protocol and the second TLS protocol exists in a network section between the communication device and another communication device, and the intermediate communication device is a device belonging to a layer L5 or higher.

In some embodiments, the forming of the communication channel may include forming the communication channel by performing a handshake procedure according to a web socket protocol.

In some embodiments, the communication device may be a client device that uses a web service through a web browser, another communication device is a server device that provides the web service, and at least some of data exchanged between the web browser and another communication device is exchanged through the quantum security channel.

In some embodiments, a module supporting the second TLS protocol is implemented as a web assembly or a plug-in for the web browser and is installed in the communication device.

In some embodiments, the communication device is a client device that uses a service through an app, another communication device is a server device that provides the service, and at least some of data exchanged between the app and another communication device is exchanged through the quantum security channel.

In some embodiments, the forming of the communication channel may include determining whether or not an intermediate communication device that supports only the first TLS protocol among the first TLS protocol and the second TLS protocol exists in a network section between the communication device and another communication device; and initiating a handshake procedure for forming the communication channel based on determining that the intermediate communication device exists.

In some embodiments, the determining of whether the intermediate communication device exists may include determining that the intermediate communication device exists, when the general security channel according to the first TLS protocol is formed as a result of performing a handshake procedure according to the second TLS protocol with another communication device.

In some embodiments, the communicating with another communication device may include transmitting target data to another communication device through the quantum security channel based on a determination that the target data corresponds to predefined important data.

According to an aspect of the present disclosure, there is provided a communication device. The communication device may comprise one or more processors; a communication interface; and a memory that stores a computer program executed by the one or more processors, wherein the computer program includes instructions for operations of: forming a general security channel according to a first transport layer security (TLS) protocol that does not support a post-quantum cryptography algorithm with another communication device; forming a communication channel of an application layer (L7) with another communication device through the general security channel; forming a quantum security channel by performing a handshake procedure according to a second TLS protocol that supports the post-quantum cryptography algorithm with another communication device through the communication channel; and communicating with another communication device through the quantum security channel.

In some embodiments, an intermediate communication device that supports only the first TLS protocol among the first TLS protocol and the second TLS protocol exists in a network section between the communication device and another communication device, and the intermediate communication device is a device belonging to a layer L5 or higher.

In some embodiments, the operation of forming of the communication channel may include an operation of forming the communication channel by performing a handshake procedure according to a web socket protocol.

In some embodiments, the communication device is a client device that uses a web service through a web browser, another communication device is a server device that provides the web service, and at least some of data exchanged between the web browser and another communication device is exchanged through the quantum security channel.

In some embodiments, a module supporting the second TLS protocol is implemented as a web assembly or a plug-in for the web browser and is installed in the communication device.

In some embodiments, the communication device is a client device that uses a service through an app, another communication device is a server device that provides the service, and at least some of data exchanged between the app and another communication device is exchanged through the quantum security channel.

In some embodiments, the operation of forming of the communication channel may include an operation of determining whether or not an intermediate communication device that supports only the first TLS protocol among the first TLS protocol and the second TLS protocol exists in a network section between the communication device and another communication device; and an operation of initiating a handshake procedure for forming the communication channel based on determining that the intermediate communication device exists.

In some embodiments, the operation of determining of whether the intermediate communication device exists may include an operation of determining that the intermediate communication device exists, when the general security channel according to the first TLS protocol is formed as a result of performing a handshake procedure according to the second TLS protocol with another communication device.

In some embodiments, the operation of communicating with another communication device may include an operation of transmitting target data to another communication device through the quantum security channel based on a determination that the target data corresponds to predefined important data.

According to still another aspect of the present closure, there is provided a computer program coupled to a communication device and stored in a computer-readable record medium to execute operations of: forming a general security channel through a first transport layer security (TLS) protocol that does not support a post-quantum cryptography algorithm with another communication device; forming an application communication channel by performing a handshake procedure according to a communication protocol of a layer 7 with another communication device through the general security channel; forming a quantum security channel by performing a handshake procedure according to a second TLS protocol that supports the post-quantum cryptography algorithm with another communication device through the application communication channel; and communicating with another communication device through the quantum security channel.

According to some exemplary embodiments of the present disclosure, by forming a communication channel of an application layer between communication devices on both sides equipped with the post-quantum cryptography (PQC)-transport layer security (TLS) module (i.e., a TLS module supporting the post-quantum cryptography algorithm), and performing a handshake procedure according to the PQC-TLS protocol (i.e., the TLS protocol supporting the post-quantum cryptography algorithm) through the corresponding communication channel, a quantum security channel (i.e., PQC-TLS channel) may be formed between the two communication devices. Accordingly, even when an intermediate communication device that does not support the PQC-TLS protocol exists in the network section (or communication path) between the two communication devices, the quantum security communication may be supported between the two communication devices.

In addition, since the PQC-TLS module (or protocol) does not need to be installed on other devices (e.g., intermediate communication devices) other than the communication devices on both sides performing communication, there is an advantage that it takes almost no time or cost to implement (support) quantum security communication.

In addition, by forming the communication channel of the application layer using a web socket protocol, which is a standard protocol, excellent portability and scalability may also be guaranteed.

Effects according to the technical idea of the present disclosure are not limited to the effects mentioned above, and other effects that are not mentioned may be obviously understood by those skilled in the art from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described with reference to the attached drawings.

Hereinafter, for clarity of the present disclosure, a transport layer security (TLS) protocol (e.g., an existing TLS protocol such as TLS 1.3) and module that do not support a post-quantum cryptography (PQC) algorithm are named "general/existing TLS module (or just TLS Module)" and "general/existing TLS protocol (or just TLS protocol)", respectively, and a TLS protocol (e.g., a TLS protocol that supports only the post-quantum cryptography algorithm, a TLS protocol that supports both existing cryptography algorithm and post-quantum cryptography algorithm, etc.) and module that support the post-quantum cryptography algorithm are named "PQC-TLS module" and "PQC-TLS protocol", respectively. For reference, the PQC-TLS module refers to a module that supports the PQC-TLS protocol (or a module that implements the PQC-TLS protocol). In some cases, the general/existing TLS protocol and PQC-TLS protocol may be named "first TLS protocol" and "second TLS protocol", respectively.

First, a problem that occurs when an intermediate communication device 13 that does not support the PQC-TLS protocol exists in a network section will be described with reference to FIG. 1.

Figure 1:
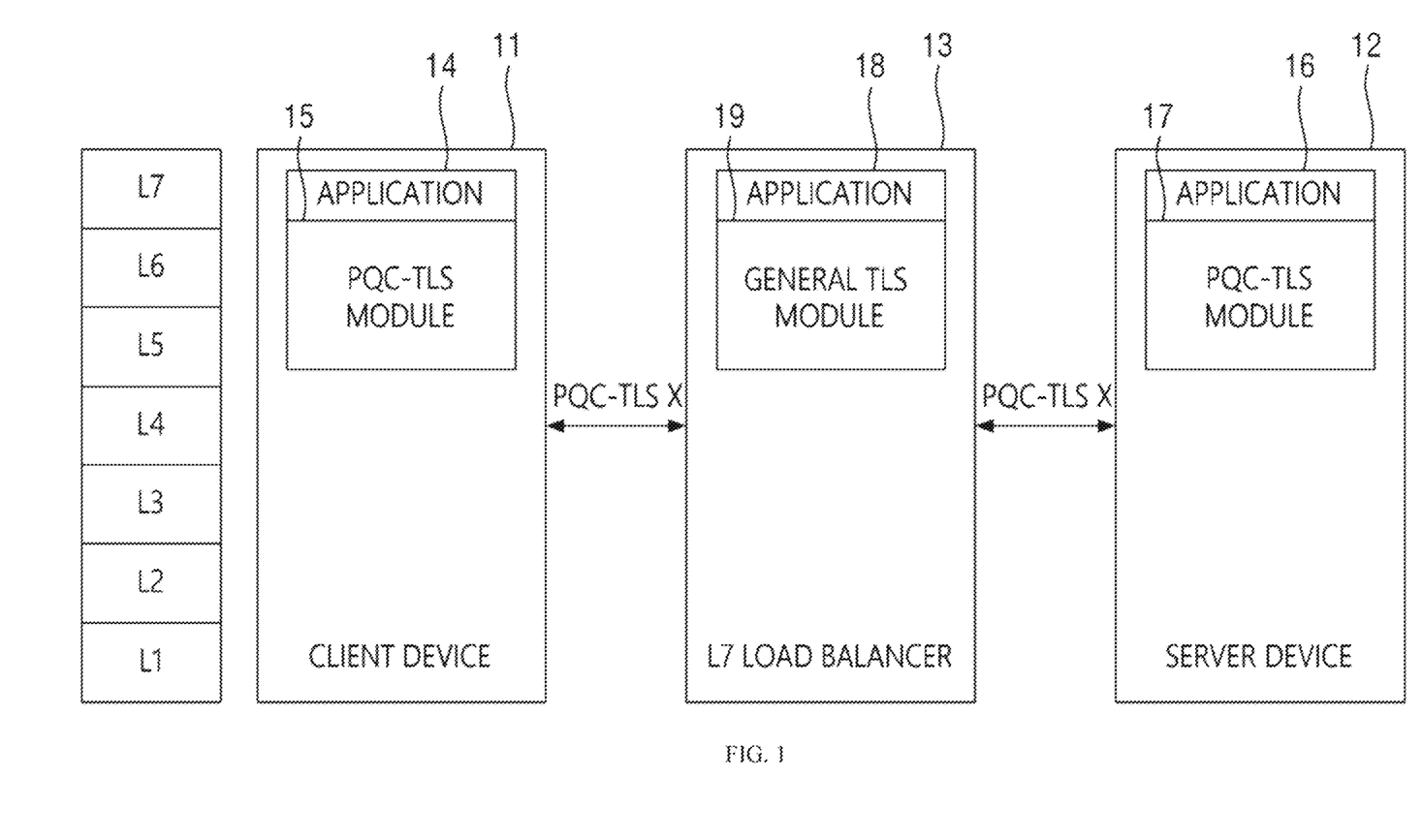
FIG. 1 is an exemplary diagram for describing a problem of a case in which an intermediate communication device that does not support a post-quantum cryptography (PQC)-transport layer security (TLS) protocol (i.e., a TLS protocol that does not support a post-quantum cryptography algorithm) exists in a network section.

An open system interconnection (OSI) 7 layer is illustrated on the left in FIG. 1. Since those skilled in the art will already be familiar with the OSI 7 layer, a description thereof will be omitted.

As illustrated in FIG. 1, it is assumed that a client device 11 and a server device 12 perform communication, and a load balancer 13 (e.g., L7 load balancer/switch) exists in a network section (or communication path) between the client device 11 and the server device 12. In addition, it is assumed that the client device 11 and the server device 12 are each equipped with a PQC-TLS module 15 and 17, and the load balancer 13 is equipped with a general TLS module 19. FIG. 1 illustrates a case in which the load balancer 13 is an "L7 load balancer", but as long as the load balancer 13 is a load balancer belonging to "L5" or higher layers (i.e., a load balancer equipped with the general TLS module 19), a problem described later may be equally applied.

For reference, an application 14 of the client device 11 refers to a program that communicates with the server device 12, such as a web browser, an application 16 of the server device 12 refers to a server program for providing a service to the client device 11, and an application 18 of the load balancer 13 refers to a program that performs load balancing at an application layer (i.e., L7). Since these points are obvious to those skilled in the art, a further description thereof will be omitted.

As above, when an intermediate communication device 13 that does not support the PQC-TLS protocol exists in the network section (or communication path) between the client device 11 and the server device 12, the two communication devices 11 and 12 may not perform quantum security communication according to the PQC-TLS protocol even if both communication devices 11 and 12 are equipped with the PQC-TLS modules 15 and 17. The reason is that a handshake procedure according to the PQC-TLS protocol between the two communication devices 11 and 12 may not be successfully completed due to the load balancer 13 (this means that since a communication encryption algorithm was not determined to be a post-quantum cryptography algorithm through the handshake procedure, an original purpose of the handshake procedure was not achieved).

To further describe, the handshake procedure between the two communication devices 11 and 12 internally involves a first handshake procedure between the client device 11 (precisely the application 14 thereof) and the load balancer 13 (precisely the application 18 thereof) and a second handshake procedure between the load balancer 13 (precisely the application 18 thereof) and the server device 12 (precisely the application 16 thereof). Since the load balancer 13 does not support the PQC-TLS protocol (or post-quantum cryptography algorithm), both the first handshake procedure and the second handshake procedure may not be successfully completed (that is, the communication encryption algorithm may not be determined to be the post-quantum cryptography algorithm through the handshake procedure). As a result, while the handshake procedure is in progress, the communication encryption algorithm is changed to the existing encryption algorithm due to the load balancer 13, and a security channel (i.e., general security channel) according to the general TLS protocol is formed between the client device 11 and the server device 12 (e.g., since the client device 11 is not aware of an existence of the intermediate communication device 13, the client device 11 recognizes that the other device 12 does not support the PQC-TLS protocol).

In summary, if even one intermediate communication device (e.g., 13) that does not support the PQC-TLS protocol exists in the network section (or communication path), the communication devices (e.g., 11, 12) on both sides that support the PQC-TLS protocol will not be able to perform the quantum security communication, and as a result, a problem of being exposed to quantum threats such as harvest now decrypt later (HNDL) (i.e., security threats caused by quantum computers) occurs.

Hereinafter, a communication method for quantum security according to some exemplary embodiments of the present disclosure designed to solve such a problem will be described in detail.

First, in order to provide convenience of understanding, a network (communication) environment to which some exemplary embodiments of the present disclosure may be applied will be briefly described with reference to FIG. 2. In the following description, a handshake procedure according to a general TLS protocol may be abbreviated as "TLS handshake procedure", and a handshake procedure according to a PQC-TLS protocol may be abbreviated as "PQC-TLS handshake procedure".

Figure 2:
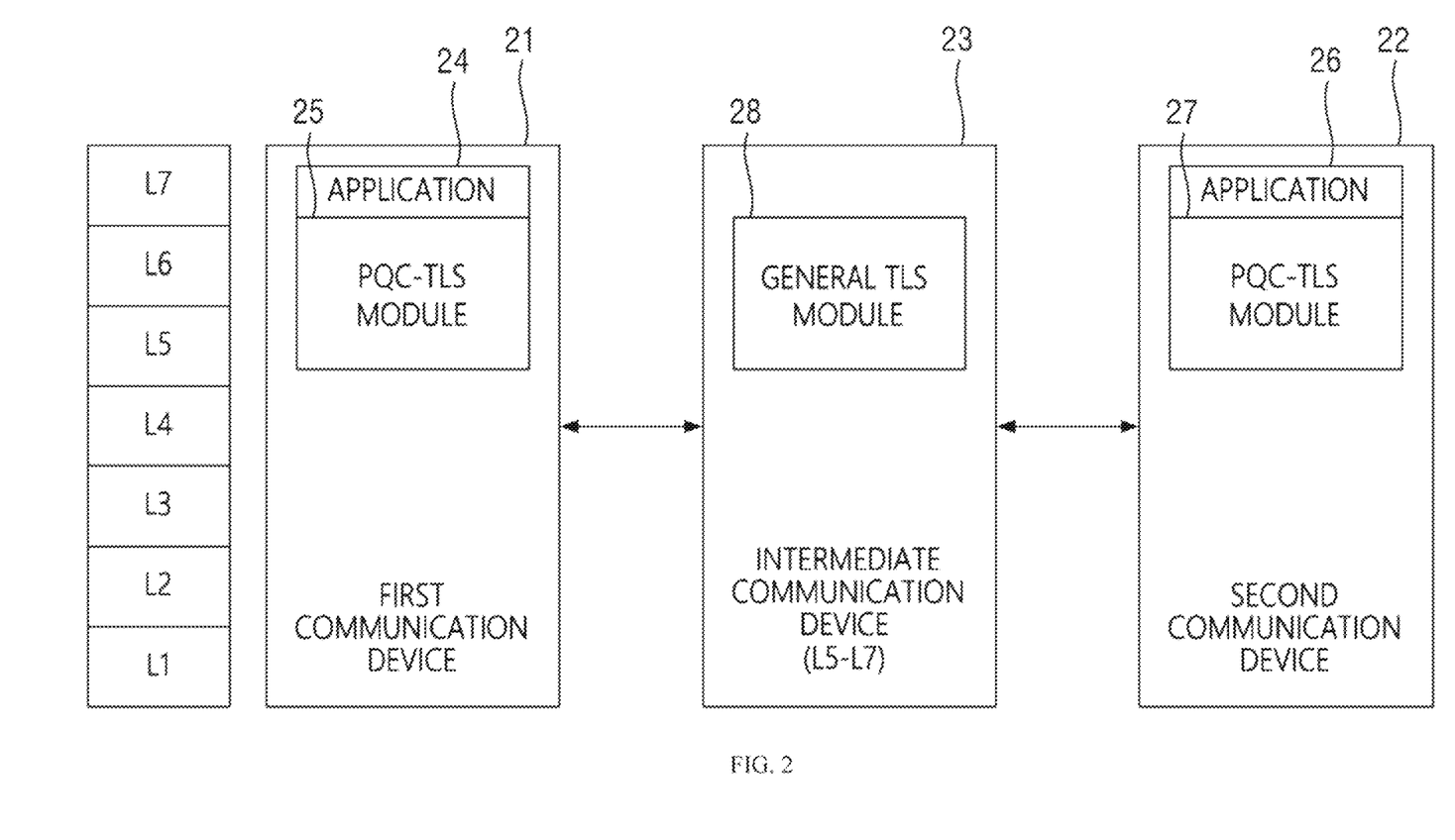
FIG. 2 is an exemplary diagram illustrating a network (communication) environment to which a communication method for quantum security according to some exemplary embodiments of the present disclosure may be applied.

As illustrated in FIG. 2, the communication method for quantum security according to exemplary embodiments may be applied when the communication devices 21 and 22 on both sides are equipped with PQC-TLS modules 25 and 27, and may be effectively utilized when an intermediate communication device 23 that does not support the PQC-TLS protocol exists in a network section (or communication path) between the communication devices 21 and 22. However, the scope of the present disclosure is not limited thereto, and the communication method for quantum security, which will be described later, may be applied as is even when the communication devices 21 and 22 on both sides are equipped with a different type of PQC module (e.g., a PQC module for a protocol other than TLS) than illustrated.

As illustrated, the intermediate communication device 23 is a device equipped with a general TLS module 28. For example, the intermediate communication device 23 may be a device (e.g., a network equipment such as a load balancer, etc.) belonging to a layer L5 or higher among the OSI 7 layers. In detail, the intermediate communication device 23 is a communication device belonging to L5, L6, or L7, and may be understood as a device that supports the general TLS protocol but does not support the PQC-TLS protocol. The intermediate communication device 23 may refer to any communication device located in the network section (or communication path) between the first communication device 21 and the second communication device 22, or may collectively refer to a plurality of communication devices.

Next, the first communication device 21 and the second communication device 22 are devices equipped with a communication function and are devices equipped with the PQC-TLS modules 25 and 27. The first communication device 21 and the second communication device 22 may further include applications 24 and 26 for exchanging data with each other. The second communication device 22, which is another device that communicates with the first communication device 21, may be a server device or a client device. Alternatively, the second communication device 22 may be a device that performs peer-to-peer communication with the first communication device 21.

For reference, only the components related to the exemplary embodiments of the present disclosure are illustrated in FIG. 2. Therefore, those skilled in the art to which the present disclosure belongs may know that other general-purpose components (e.g., a processor, a memory, etc.) may be further included in addition to the components illustrated in FIG. 2.

Figure 3:
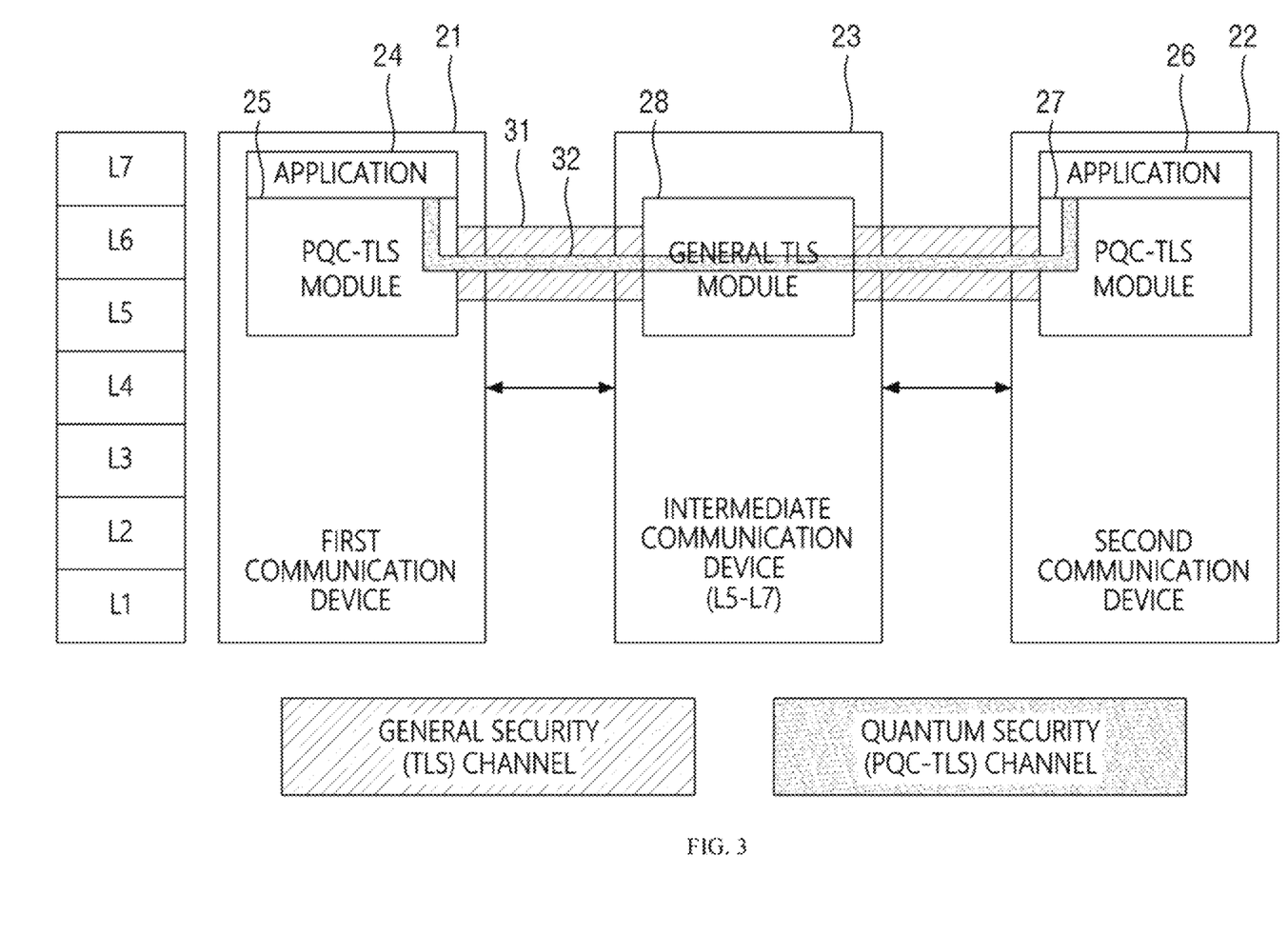
FIG. 3 is an exemplary diagram for describing a technical principle of the communication method for quantum security according to some exemplary embodiments of the present disclosure.

The communication devices 21 and 22 (or applications 24 and 26 thereof) on both sides may perform quantum security communication according to the PQC-TLS protocol. Specifically, as illustrated in FIG. 3, the first communication device 21 may form a security channel 31 (i.e., a general security channel) according to the general TLS protocol with the second communication device 22, and form a quantum security channel 32 according to the PQC-TLS protocol in an application layer (i.e., L7 and a layer higher than a layer to which an original PQC-TLS protocol belongs) through the corresponding channel 31. In this way, the quantum security communication may be supported between the two communication devices 21 and 22 even when the intermediate communication device 23 that does not support the PQC-TLS protocol exists. This is because the PQC-TLS handshake procedure in the application layer is unrelated to the intermediate communication device 23. A specific process of forming the quantum security channel 32 will be described in more detail with reference to FIG. 5 later.

Each of the communication devices 21 and 22 may be implemented as any computing device equipped with a computing function and a communication function. An example of such a computing device will be described with reference to FIG. 7.

For reference, since the computing device is an aggregate in which various components (e.g., a memory, a processor, etc.) interact, the computing device may also be named a "computing system" in some cases. In addition, the term computing system may also include the concept of an aggregate in which a plurality of computing devices interact. The communication device (e.g., 21) may also be named "communication systems" in some cases.

The communication devices 21 to 23 illustrated in FIG. 3 may communicate via a network. Here, the network may be implemented as all types of wired/wireless networks such as a Local Area Network (LAN), a Wide Area Network (WAN), a mobile radio communication network, and Wireless Broadband Internet (Wibro).

Hereinabove, the network (communication) environment in which the communication method for quantum security according to some exemplary embodiments of the present disclosure may be applied and the technical principles of the method have been briefly described with reference to FIGS. 2 and 3.

Hereinafter, the communication method for quantum security according to some exemplary embodiments of the present disclosure will be described with reference to FIG. 4.

Figure 4:
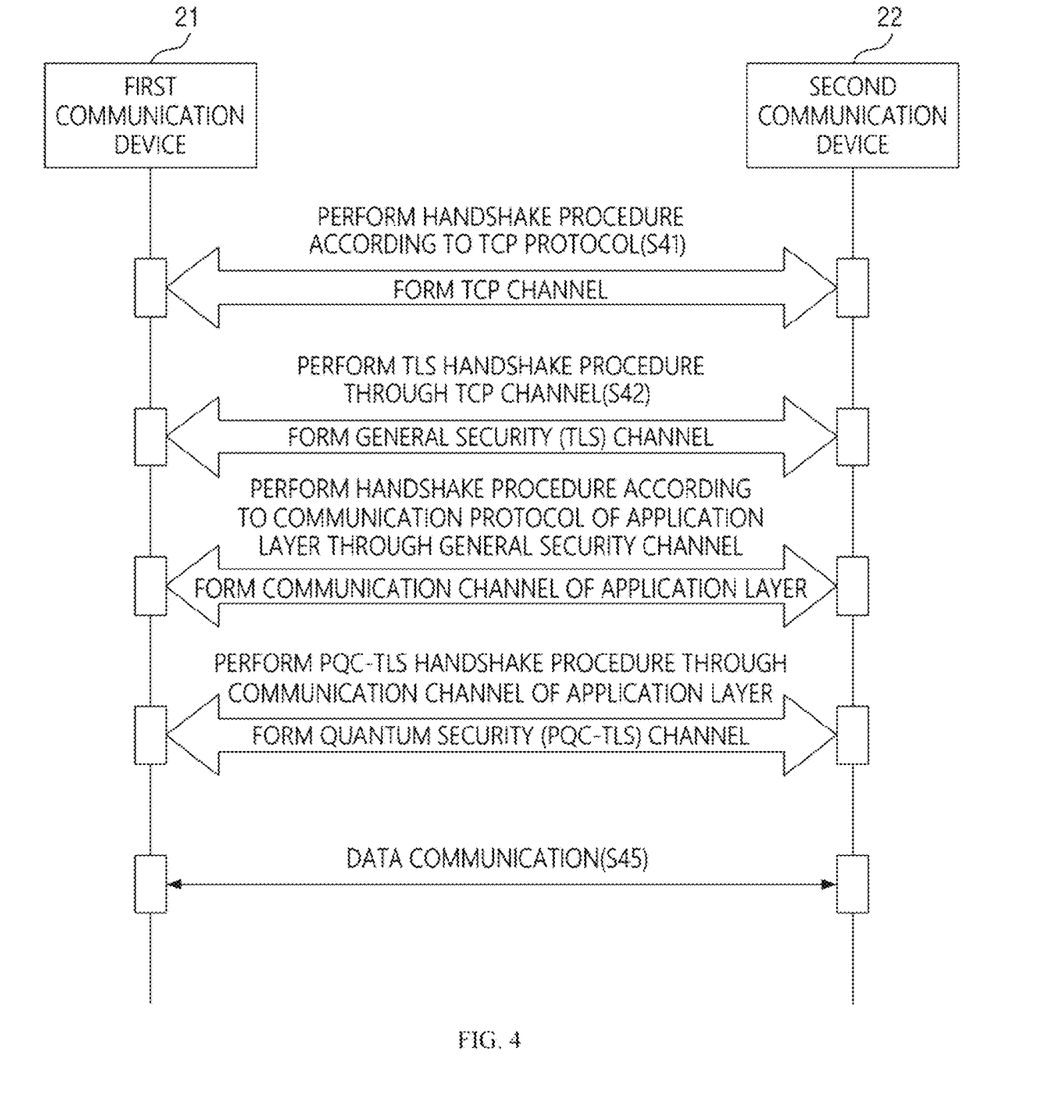
FIG. 4 is an exemplary flowchart illustrating detailed processes of the communication method for quantum security according to some exemplary embodiments of the present disclosure.

FIG. 4 is an exemplary flowchart illustrating detailed processes of the communication method for quantum security according to some exemplary embodiments of the present disclosure. However, this is only a preferred exemplary embodiment for achieving the object of the present disclosure, and some steps may also be added or deleted as needed. In the drawings of FIG. 4 and below, the intermediate communication device 23 is omitted for convenience of understanding.

As illustrated in FIG. 4, the communication method for quantum security according to some exemplary embodiments may begin at step S41 in which the communication devices 21 and 22 on both sides perform a handshake procedure (hereinafter abbreviated as "TCP handshake procedure") according to the transmission control protocol (TCP) protocol. In other words, the first communication device 21 may perform the TCP handshake procedure with the second communication device 22. If the procedure is successfully completed, a TCP channel may be formed between the two communication devices 21 and 22.

In step S42, the first communication device 21 may perform a handshake procedure with the second communication device 22 according to the general TLS protocol. The two communication devices 21 and 22 may perform the TLS handshake procedure through the TCP channel. If the procedure is successfully completed, a general security channel (i.e., TLS channel) may be formed between the two communication devices 21 and 22.

In step S43, the first communication device 21 may form a communication channel (i.e., application communication channel) by performing a handshake procedure according to a communication protocol of an application layer (i.e., L7) with the second communication device 22 through the general security channel For example, the first communication device 21 may form a communication channel of an application layer by performing a handshake procedure according to a web socket protocol with the second communication device 22. Since the web socket protocol corresponds to a standard protocol, excellent portability and scalability may be guaranteed by using the web socket protocol. However, the scope of the present disclosure is not limited thereto, and the two communication devices 21 and 22 may also form the communication channel of the application layer using different communication protocols.

Meanwhile, in some exemplary embodiments, the first communication device 21 may determine whether an intermediate communication device 23 that does not support the PQC-TLS protocol exists in a network section (or communication path) between the first communication device 21 and the second communication device 22. In addition, the first communication device 21 may initiate a handshake procedure for forming the communication channel of the application layer based on the determination that such an intermediate communication device 23 exists. If the intermediate communication device 23 does not exist, the first communication device 21 may perform the handshake procedure according to the PQC-TLS protocol in the layer to which the original PQC-TLS protocol belongs without forming the communication channel of the application layer with the second communication device 22.

In the previous exemplary embodiments, when a security channel (i.e., a general security channel) according to the general TLS protocol is formed or the handshake procedure is terminated in failure, etc. as a result of performing the handshake procedure according to the PQC-TLS protocol with the second communication device 22, the first communication device 21 may determine that the intermediate communication device 23 that does not support the PQC-TLS protocol exists within the network section (or communication path). For reference, in some cases, step S42 related to the TLS handshake procedure described above may also mean a case in which the general security channel is formed as a result of performing the PQC-TLS handshake procedure.

In step S44, the first communication device 21 may perform the handshake procedure according to the PQC-TLS protocol with the second communication device 22 through the communication channel of the application layer. That is, the PQC-TLS handshake procedure may be performed in the application layer. If the procedure is successfully completed, a quantum security channel (i.e., PQC-TLS channel) may be formed between the two communication devices 21 and 22.

In step S45, the first communication device 21 may perform data communication (exchange) with the second communication device 22. For example, the first communication device 21 may exchange at least some data with the second communication device 22 through the quantum security channel.

Meanwhile, a specific method in which the first communication device 21 and the second communication device 22 perform data communication (exchange) may vary depending on the exemplary embodiment.

In some exemplary embodiments, it may be determined whether target data to be transmitted from the first communication device 21 to the second communication device 22 corresponds to predefined important data. Any method may be used to determine whether or not the target data is the important data. In addition, the first communication device 21 may transmit the target data to the second communication device 22 through the quantum security channel based on the determination that the target data corresponds to the important data. That is, the first communication device 21 may transmit only selected important data through the quantum security channel.

In some other exemplary embodiments, the first communication device 21 may further form an additional communication channel (e.g., a general security channel of the application layer) in addition to the quantum security channel already formed with the second communication device 22. In addition, the first communication device 21 may transmit the important data to the second communication device 22 through the quantum security channel and transmit non-important data to the second communication device 22 through the additional communication channel.

In some still other exemplary embodiments, the first communication device 21 may divide the target data (e.g., important data) into a plurality of data pieces, transmit some of the plurality of data pieces to the second communication device 22 through the quantum security channel, and transmit other pieces of data through the additional communication channel described above. In this case, the total quantity of data pieces, the quantity and number of data pieces (hereinafter referred to as "quantum data pieces") transmitted through the quantum security channel, etc. may be negotiated in advance between the first communication device 21 and the second communication device 22 (e.g., negotiated through a separate handshake procedure, etc.), and the second communication device 22 may reassemble the received data pieces based on the negotiated information. In some cases, the total quantity of data pieces, the quantity and number of quantum data pieces, etc. may be determined based on the importance, size, transmission time, etc. of the data (the higher the importance, the greater the total quantity of data pieces or the quantity of quantum data pieces, etc., a random number string is generated using the transmission time as a seed and data pieces with numbers corresponding to the random number string are transmitted through the quantum security channel, a random value generated using the transmission time as the seed is used as the total quantity of data pieces or the quantity of quantum data pieces, a first random value generated using the transmission time as the seed is used as the total quantity of data pieces and a second random value generated using the sum of the transmission time and the first random value as the seed is used as the quantity of quantum data pieces, etc.).

In some still other exemplary embodiments, data exchange (communication) may also be performed based on various combinations of the above-described exemplary embodiments.

Hereinabove, the communication method for quantum security according to some exemplary embodiments of the present disclosure has been described with reference to FIG. 4. As described above, the quantum security channel (e.g., 32, i.e., PQC-TLS channel) may be formed between the two communication devices 25 and 27 by forming the communication channel of the application layer between the communication devices 21 and 22 on both sides equipped with the PQC-TLS modules 25 and 27, and performing the handshake procedure according to the PQC-TLS protocol through the corresponding communication channel. Accordingly, even when the intermediate communication device 23 that does not support the PQC-TLS protocol exists in the network section (or communication path) between the two communication devices 25 and 27, the quantum security communication may be supported between the two communication devices 21 and 22.

In addition, since the PQC-TLS module (or protocol) does not need to be installed on other devices (e.g., intermediate communication device 23) other than the communication devices 21 and 22 on both sides performing communication, there is an advantage that it takes almost no time or cost to implement (support) the quantum security communication.

In addition, when the communication channel of the application layer is formed using the web socket protocol, which is a standard protocol, excellent portability and scalability may also be guaranteed.

Hereinafter, in order to further provide convenience of understanding, some examples of utilization of the communication method for quantum security described above will be briefly described with reference to FIGS. 5 and 6.

Figure 5:
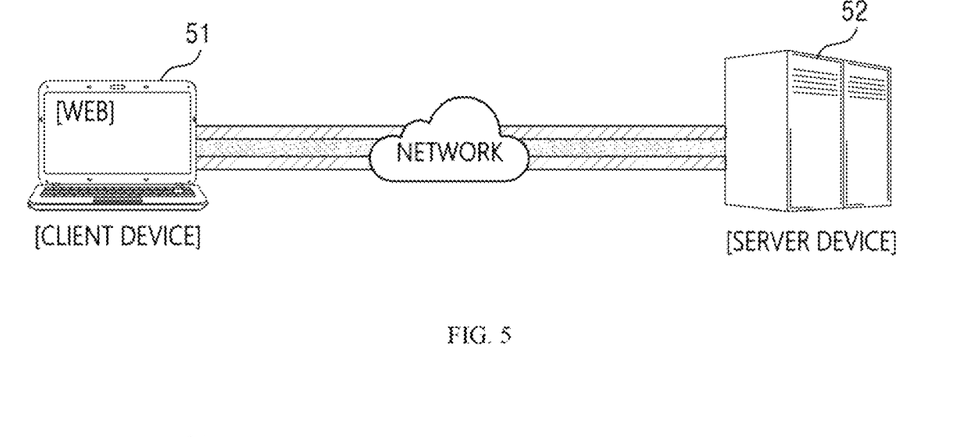
FIGS. 5 and 6 illustrate some usage examples of the communication method for quantum security according to some exemplary embodiments of the present disclosure.
Figure 6:
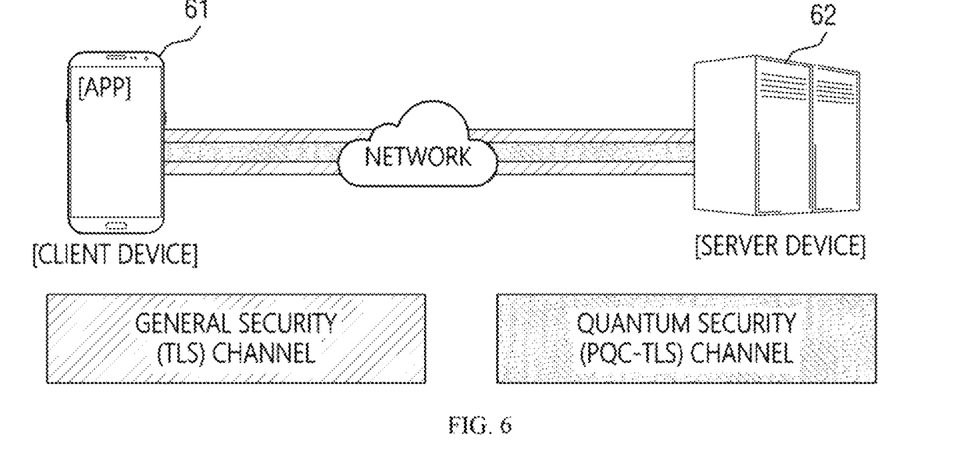

FIGS. 5 and 6 illustrate a case where the communication method for quantum security described above is used for communication between client devices 51 and 61 and server devices 52 and 53. It may be understood that the illustrated client devices 51 and 61 correspond, for example, to the above-described first communication device 21 (or second communication device 22), and the server devices 52 and 53 correspond, for example, to the above-described second communication device 22 (or second communication device 21).

As illustrated in FIG. 5, the client device 51 is a device that uses a web service through a web browser (that is, the application (e.g., 24) is a web browser), and the server device 52 is a device that provides the web service. In this case, at least some of the data exchanged between the web browser of the client device 51 and the server device 52 may be exchanged through the quantum security channel. In this way, users of the two communication devices 51 and 52 may be free from quantum threats. For example, the client device 51 may transmit at least some of API application programming interface (API) data to the server device 52 through the quantum security channel according to the PQT-TLS protocol.

In FIG. 5, the client device 51 may be installed with a PQC-TLS module (e.g., 25) implemented as a web assembly or a plug-in for the web browser. However, the scope of the present disclosure is not limited thereto, and the PQC-TLS module (e.g., 25) may also be implemented in other ways.

Next, in FIG. 6, a client device 61 is a device that uses a service through an app (i.e., the application (e.g., 24) is an app implemented in a general programming language such as Java, C, etc.), and a server device 62 is a device that provides the service. For example, the client device 61 may be a terminal on which a mobile app is installed. However, the scope of the present disclosure is not limited thereto.

Similar to what was described above, at least some of the data exchanged between the app on the client device 61 and the server device 62 may also be exchanged through the quantum security channel. In this way, users of the two communication devices 61 and 62 may be free from quantum threats.

Hereinabove, several examples of utilization of the communication method for quantum security described above have been described with reference to FIGS. 5 and 6. Hereinafter, an exemplary computing device 70 capable of implementing the communication devices 21 and 22 according to some exemplary embodiments of the present disclosure will be described.

Figure 7:
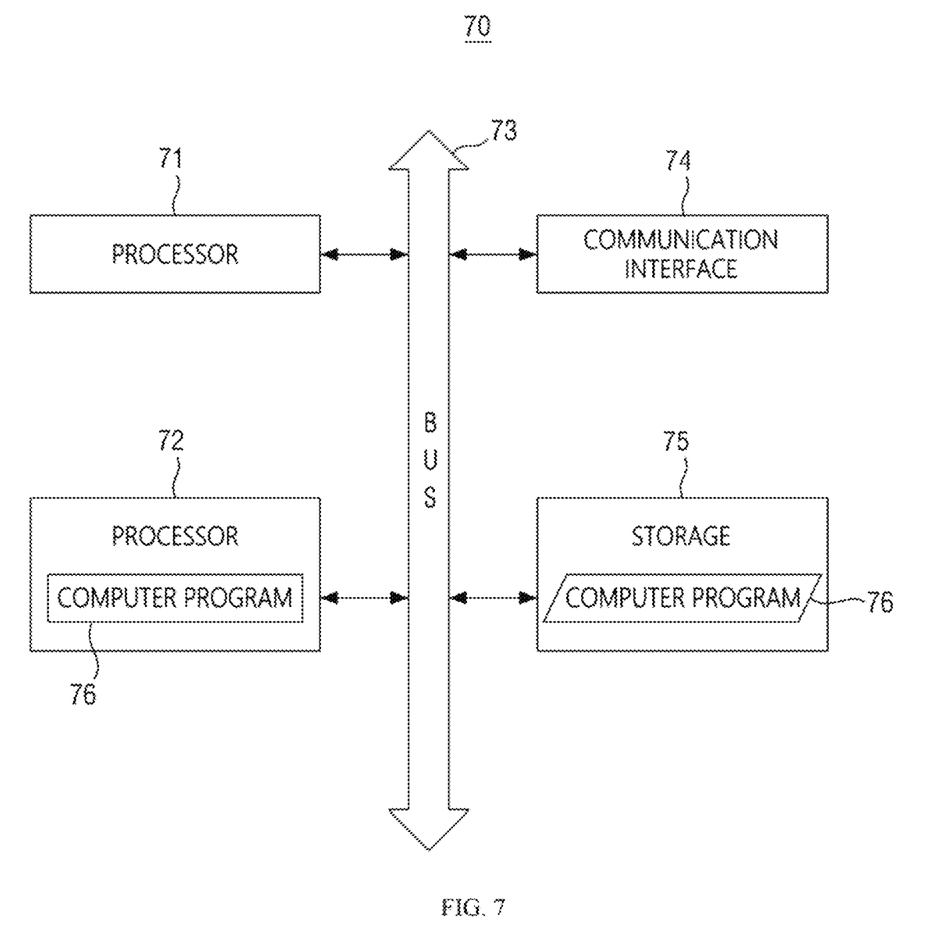
FIG. 7 illustrates an exemplary computing device capable of implementing communication devices according to some exemplary embodiments of the present disclosure.

FIG. 7 is an exemplary hardware configuration diagram illustrating the computing device 70.

As illustrated in FIG. 7, a computing device 70 may include one or more processors 71, a bus 73, a communication interface 74, a memory 72 for loading a computer program 76 executed by the processor 71, and a storage 75 for storing the computer program 76. However, only the components related to the exemplary embodiments of the present disclosure are illustrated in FIG. 7. Therefore, those skilled in the art to which the present disclosure belongs may know that other general-purpose components may be further included in addition to the components illustrated in FIG. 7. That is, the computing device 70 may further include various components other than the components illustrated in FIG. 7. In addition, in some cases, the computing device 70 may also be configured in a form in which some of the components illustrated in FIG. 7 are omitted. Hereinafter, each component of the computing device 70 will be described.

The processor 71 may control an overall operation of each component of the computing device 70. The processor 71 may include at least one of a central processing unit (CPU), a micro processor unit (MPU), a micro controller unit (MCU), a graphic processing unit (GPU), a neural processing unit (NPU), or any type of processor well known in the art of the present disclosure. In addition, the processor 71 may perform a calculation on at least one application or program for executing the operations/methods according to the exemplary embodiments of the present disclosure. The computing device 70 may include one or more processors.

Next, the memory 72 stores various data, commands, and/or information. The memory 72 may load the computer program 76 from the storage 75 to execute the operations/methods according to the exemplary embodiments of the present disclosure. The memory 72 may be implemented as a volatile memory such as RAM, but the technical scope of the present disclosure is not limited thereto.

Next, the bus 73 may provide a communications function between the components of the computing device 70. The bus 73 may be implemented as various types of buses, such as an address bus, a data bus, and a control bus.

Next, the communication interface 74 supports wired/wireless Internet communications of the computing device 70. In addition, the communication interface 74 may also support various communication methods other than Internet communications. To this end, the communication interface 74 may include a communication module well known in the art of the present disclosure.

Next, the storage 75 may non-temporarily store one or more computer programs 76. The storage 75 may include a non-volatile memory such as a read only memory (ROM), an erasable programmable ROM (EPROM), an electrically erasable programmable ROM (EEPROM), a flash memory, or the like, a hard disk, a removable disk, or any form of computer-readable recording medium well known in the art to which the present disclosure pertains.

Next, the computer program 76 may include one or more instructions that when loaded into memory 72, cause the processor 71 to perform the operations/methods according to various exemplary embodiments of the present disclosure. That is, the processor 71 may perform the operations/methods according to various exemplary embodiments of the present disclosure by executing the one or more instructions.

For example, the computer program 76 may include instructions that perform an operation of forming a general security channel (e.g., 31) according to a first TLS protocol (i.e., a general TLS protocol) that does not support a post-quantum cryptography algorithm with another communication device (e.g., 22), an operation of forming a communication channel of an application layer (L7) with another communication device (e.g., 22) through the corresponding general security channel (e.g., 31), an operation of forming a quantum security channel (e.g., 32) by performing a handshake procedure according to a second TLS protocol (i.e., PQC-TLS protocol) that supports the post-quantum cryptography algorithm with another communication device (e.g., 22) through the corresponding communication channel, and an operation of communicating with another communication device (e.g., 22) through the corresponding quantum security channel (e.g., 32).

As another example, the computer program 76 may include instructions that perform at least some of the steps/operations described with reference to FIGS. 2 to 6.

In the case as illustrated, the first communication device 21 or the second communication device 22 according to some exemplary embodiments of the present disclosure may be implemented via the computing device 70.

Hereinabove, the exemplary computing device 70 capable of implementing the communication devices 21 and 22 according to some exemplary embodiments of the present disclosure has been described with reference to FIG. 7.

So far, a variety of embodiments of the present disclosure and the effects according to embodiments thereof have been mentioned with reference to FIGS. 1 to 14. The effects according to the technical idea of the present disclosure are not limited to the forementioned effects, and other unmentioned effects may be clearly understood by those skilled in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A communication method for quantum security performed by a first communication device, the communication method comprising:
    forming a general security channel according to a first transport layer security (TLS) protocol that does not support a post-quantum cryptography algorithm with a second communication device;
    forming a communication channel of an application layer L7 with the second communication device through the general security channel;
    forming a quantum security channel by performing a handshake procedure according to a second TLS protocol that supports the post-quantum cryptography algorithm with the second communication device through the communication channel; and
    communicating with the second communication device through the quantum security channel,
    wherein an intermediate communication device that supports only the first TLS protocol among the first TLS protocol and the second TLS protocol exists in a network section between the first communication device and the second communication device, and
    wherein the intermediate communication device is a device belonging to a layer L5 or higher.

2. The communication method of claim 1, wherein the forming of the communication channel includes forming the communication channel by performing a handshake procedure according to a web socket protocol.

3. The communication method of claim 1, wherein the first communication device is a client device that uses a web service through a web browser,
    the second communication device is a server device that provides the web service, and
    at least some of data exchanged between the web browser and the second communication device is exchanged through the quantum security channel.

4. The communication method of claim 3, wherein a module supporting the second TLS protocol is implemented as a web assembly or a plug-in for the web browser and is installed in the first communication device.

5. The communication method of claim 1, wherein the first communication device is a client device that uses a service through an app, the second communication device is a server device that provides the service, and at least some of data exchanged between the app and the second communication device is exchanged through the quantum security channel.

6. The communication method of claim 1, wherein the forming of the communication channel includes:

determining whether or not the intermediate communication device that supports only the first TLS protocol among the first TLS protocol and the second TLS protocol exists in the network section between the first communication device and the second communication device; and initiating a handshake procedure for forming the communication channel based on determining that the intermediate communication device exists.

7. The communication method of claim 6, wherein the determining of whether the intermediate communication device exists includes determining that the intermediate communication device exists, when the general security channel according to the first TLS protocol is formed as a result of performing a handshake procedure according to the second TLS protocol with the second communication device.

8. The communication method of claim 1, wherein the communicating with the second communication device includes transmitting target data to the second communication device through the quantum security channel based on a determination that the target data corresponds to predefined important data.

9. A communication device comprising:

one or more processors;

a communication interface; and a memory that stores a computer program executed by the one or more processors, wherein the computer program includes instructions for operations of:

forming a general security channel according to a first transport layer security (TLS) protocol that does not support a post-quantum cryptography algorithm with a second communication device;

forming a communication channel of an application layer (L7) with the second communication device through the general security channel;

forming a quantum security channel by performing a handshake procedure according to a second TLS protocol that supports the post-quantum cryptography algorithm with the second communication device through the communication channel; and communicating with the second communication device through the quantum security channel, wherein an intermediate communication device that supports only the first TLS protocol among the first TLS protocol and the second TLS protocol exists in a network section between the communication device and the second communication device, and wherein the intermediate communication device is a device belonging to a layer L5 or higher.

10. The communication device of claim 9, wherein the operation of forming of the communication channel includes an operation of forming the communication channel by performing a handshake procedure according to a web socket protocol.

11. The communication device of claim 9, wherein the communication device is a client device that uses a web service through a web browser, the second communication device is a server device that provides the web service, and at least some of data exchanged between the web browser and the second communication device is exchanged through the quantum security channel.

12. The communication device of claim 11, wherein a module supporting the second TLS protocol is implemented as a web assembly or a plug-in for the web browser and is installed in the communication device.

13. The communication device of claim 9, wherein the communication device is a client device that uses a service through an app, the second communication device is a server device that provides the service, and at least some of data exchanged between the app and the second communication device is exchanged through the quantum security channel.

14. The communication device of claim 9, wherein the operation of forming of the communication channel includes:

an operation of determining whether or not the intermediate communication device that supports only the first TLS protocol among the first TLS protocol and the second TLS protocol exists in the network section between the communication device and the second communication device; and an operation of initiating a handshake procedure for forming the communication channel based on determining that the intermediate communication device exists.

15. The communication device of claim 14, wherein the operation of determining of whether the intermediate communication device exists includes an operation of determining that the intermediate communication device exists, when the general security channel according to the first TLS protocol is formed as a result of performing a handshake procedure according to the second TLS protocol with the second communication device.

16. The communication device of claim 9, wherein the operation of communicating with the second communication device includes an operation of transmitting target data to the second communication device through the quantum security channel based on a determination that the target data corresponds to predefined important data.

17. A non-transitory computer-readable record medium storing a computer program coupled to a first communication device, the computer program being executable by at least one processor to execute operations of:

forming a general security channel through a first transport layer security (TLS) protocol that does not support a post-quantum cryptography algorithm with a second communication device;

forming an application communication channel by performing a handshake procedure according to a communication protocol of a layer 7 with the second communication device through the general security channel;

forming a quantum security channel by performing a handshake procedure according to a second TLS protocol that supports the post-quantum cryptography algorithm with the second communication device through the application communication channel; and communicating with the second communication device through the quantum security channel, wherein an intermediate communication device that supports only the first TLS protocol among the first TLS protocol and the second TLS protocol exists in a network section between the first communication device and the second communication device, and wherein the intermediate communication device is a device belonging to a layer L5 or higher.

* * * * *